United States Patent
Schwarze

(10) Patent No.: US 11,556,937 B2
(45) Date of Patent: Jan. 17, 2023

(54) VIRTUAL REALITY FOR SITUATIONAL HANDLING

(71) Applicant: SAP SE, Walldorf (DE)

(72) Inventor: Peter Schwarze, Sinsheim Dühren (DE)

(73) Assignee: SAP SE, Walldorf (DE)

(*) Notice: Subject to any disclaimer, the term of this patent is extended or adjusted under 35 U.S.C. 154(b) by 748 days.

(21) Appl. No.: 16/450,165

(22) Filed: Jun. 24, 2019

(65) Prior Publication Data
US 2020/0402069 A1 Dec. 24, 2020

(51) Int. Cl.
G06Q 30/00 (2012.01)
G06Q 30/06 (2012.01)
G06Q 10/08 (2012.01)
G06T 19/00 (2011.01)

(52) U.S. Cl.
CPC ......... G06Q 30/012 (2013.01); G06Q 10/087 (2013.01); G06Q 10/0832 (2013.01); G06Q 10/0833 (2013.01); G06Q 30/0635 (2013.01); G06T 19/003 (2013.01)

(58) Field of Classification Search
CPC ............. G06Q 30/012; G06Q 30/0635; G06Q 10/087; G06Q 10/0833; G06Q 10/0832; G06T 19/003
See application file for complete search history.

(56) References Cited

U.S. PATENT DOCUMENTS

| | | | |
|---|---|---|---|
| 7,518,511 B1 | 4/2009 | Panja et al. | |
| 7,809,676 B2 | 10/2010 | Chorley et al. | |
| 8,046,275 B2 | 10/2011 | Simon et al. | |
| 2010/0017248 A1 | 1/2010 | Boskovic et al. | |
| 2015/0192774 A1* | 7/2015 | Watanabe | G06Q 10/087 345/8 |
| 2019/0043004 A1* | 2/2019 | Lesieur | G06Q 10/087 |
| 2019/0122174 A1* | 4/2019 | Gil | G06V 20/64 |
| 2019/0385115 A1* | 12/2019 | Biermann | G01K 1/024 |

FOREIGN PATENT DOCUMENTS

| | | |
|---|---|---|
| DE | 102012100354 A1 | 7/2013 |
| KR | 20190003214 A | 1/2019 |

OTHER PUBLICATIONS

Cirulis, A., & Ginters, E. (2013). Augmented reality in Logistics. Procedia Computer Science, 26, 14-20. https://doi.org/10.1016/j.procs.2013.12.003 (Year: 2013).*
"Advanced Task Framework," Published by: https://docs.oracle.com, Retrieved on Mar. 14, 2019.
"Oracle Warehouse Management Rules Engine," Published by: https://docs.oracle.com, Retrieved on Mar. 15, 2019.

* cited by examiner

*Primary Examiner* — Shannon S Campbell
*Assistant Examiner* — Manal A. Alsamiri
(74) *Attorney, Agent, or Firm* — Schwegman Lundberg & Woessner, P.A.

(57) ABSTRACT

Systems, methods, and computer programmable products are described herein for situational handling using a virtual reality application. A procurement system receives an order including one or more goods and a situation. A cloud platform receives sensor data of a package containing the one or more goods. A scanner scans the package and a storage location of the package. The procurement system provides the storage location to an virtual reality (VR) application for display and a notification of the situation once it occurs.

20 Claims, 7 Drawing Sheets

VIRTUAL REALITY FOR SITUATIONAL HANDLING

TECHNICAL FIELD

The subject matter described herein relates to software utilizing virtual reality for diverse applications including for goods received.

BACKGROUND

Goods shipment is a complex process. During the shipment of goods, a package containing such goods can undergo various environmental temperature conditions such as temperature, humidity, and acceleration, jostling during shipment, and/or any other condition measurable by a sensor. Some goods may be susceptible to being damaged when encountering these conditions. Additionally, the location of a package during shipment or its storage may be needed to facilitate more expeditious shipping.

SUMMARY

In one aspect, a procurement system receives an order having one or more goods and a situation. A cloud platform receives sensor data of a package containing the one or more goods. A scanner scans the package and a storage location of the package. The procurement system provides the storage location to a virtual reality (VR) application for display and a notification of the situation once it occurs.

In some variations, a virtual view of the package in its storage location can be displayed on a display of an electronic device based on an image captured by a camera of the electronic device. On top of the virtual view, a visualization of directional features can be displayed to identify how to locate the package.

In other variations, one or more remedies for the situation can be provided via the VR application based on the notification. The one or more remedies can include generating a communication to a supplier of the one or more goods or generating a re-order of the one or more goods.

In some variations, the VR application can display at least one of a user's view of the storage location or a top down perspective view of the storage location.

In other variations, the sensor data includes at least one of temperature data, global positioning system (GPS) data, or accelerometer data.

In some variations, the situation occurs when the temperature of the package exceeds a temperature threshold or when the package experiences an acceleration that exceeds an acceleration threshold.

In other variations, the sensor data can be correlated with the situation identification. The correlating can be performed by either the cloud platform or the procurement system.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides a virtual reality (VR) application for identifying and/or tracking locations of goods which, in turn, more readily provides visual information about such goods.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The shipment of goods is a dynamic process. During the shipment of goods, the needs of suppliers and/or consumers may change. For example, the demand for a particular good may be urgent and require the acceleration of the delivery process. During a high volume season, the number of goods being shipped may require a heightened awareness of the exact location of a good. In some circumstances, the good may be perishable and tracking of its location may be imperative to ensuring the good does not perish. Under any of these circumstances, use of an VR application that identifies specific locations of goods as provided herein can be used to ensure the goods are more efficiently tracked throughout the shipment process. Use of the subject matter herein can speed up the delivery process for goods received.

Figure 1:
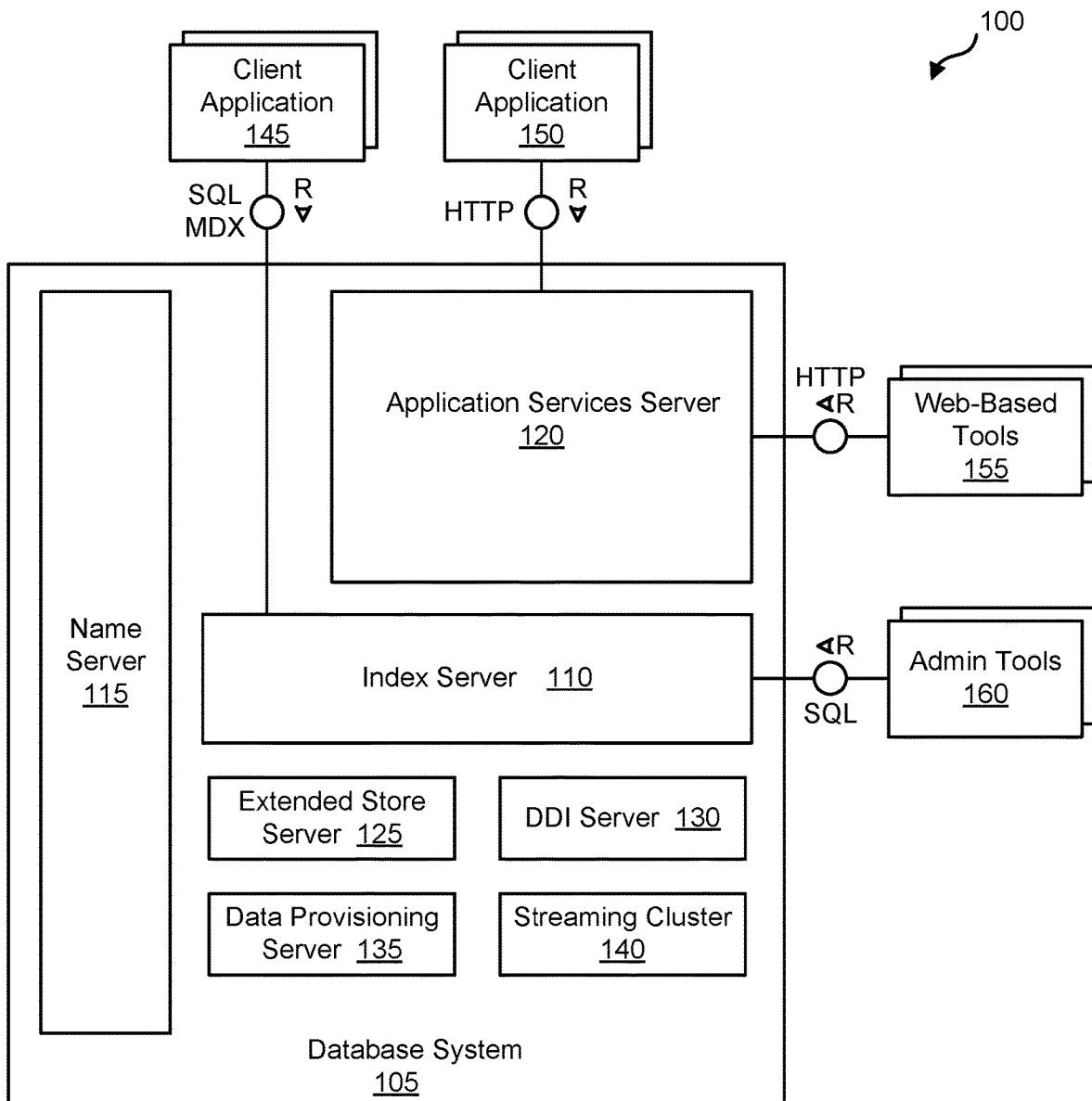
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk input output (I/O) and in which disk storage is required to make any changes durable. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also be used to run web-based tools 155 for administration, life-cycle management, and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter software development kit (SDK) for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
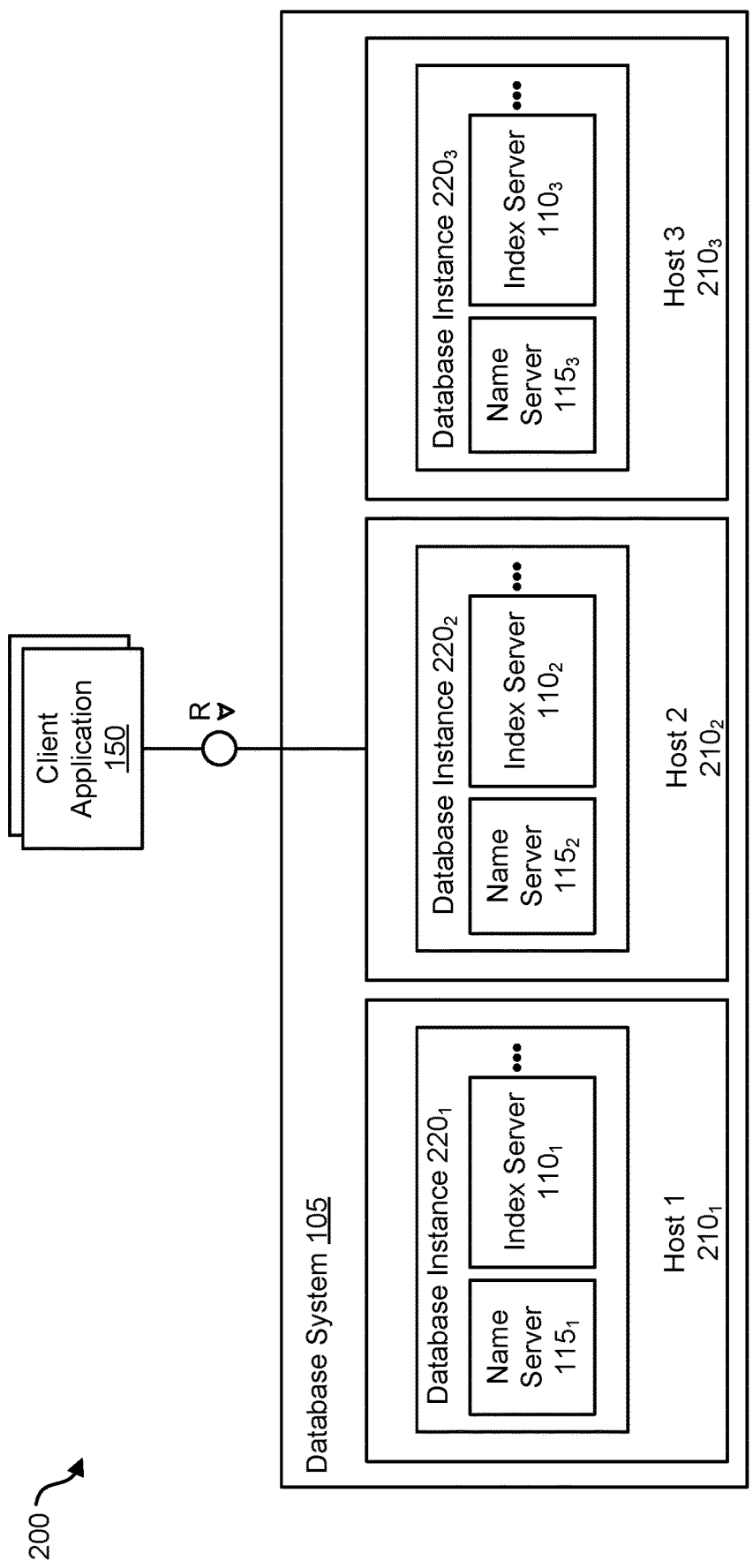
FIG. 2 is a system diagram illustrating an example database system that can support distribution of server components across multiple hosts for scalability and/or availability purposes for use in connection with the current subject matter.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 150 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
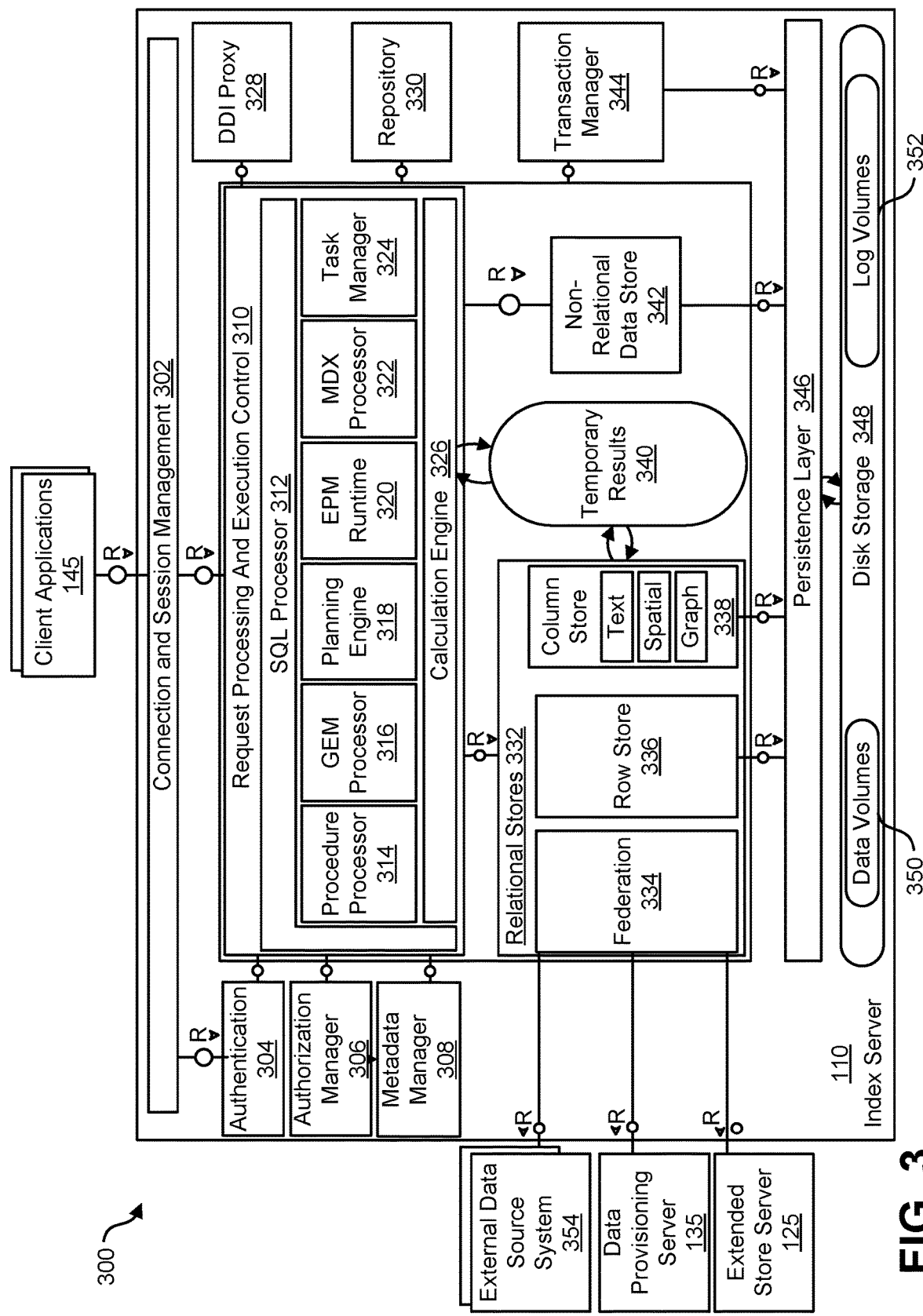
FIG. 3 is a diagram illustrating an architecture for an index server for use in connection with the current subject matter.

FIG. 3 is a diagram 300 illustrating an architecture for the index server 110 (which can, as indicated above, be one of many instances). A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 105 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework). Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 306. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 306 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead, it is built using the column store 338, which can have a dedicated graph Application Program Interface (API).

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extend transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and save points. The persistence layer 346 can provide interfaces for writing and reading persisted data and it can also contain a logger component that manages a transaction log. Recovery log entries can be written in the persistence layer 346 (in recovery log volumes 352) explicitly by using log interface or implicitly when using the virtual file abstracting. The recovery log volumes 352 can include redo logs which specify database operations to be replayed whereas data volume 350 contains undo logs which specify database operations to be undone as well as cleanup logs of committed operations which can be executed by a garbage collection process to reorganize the data area (e.g., free up space occupied by deleted data etc.).

The persistence layer 346 stores data in persistent disk storage 348 which, in turn, can include data volumes 350 and/or transaction log volumes 352 that can be organized in pages. Different page sizes can be supported, for example, between 4k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Figure 4:
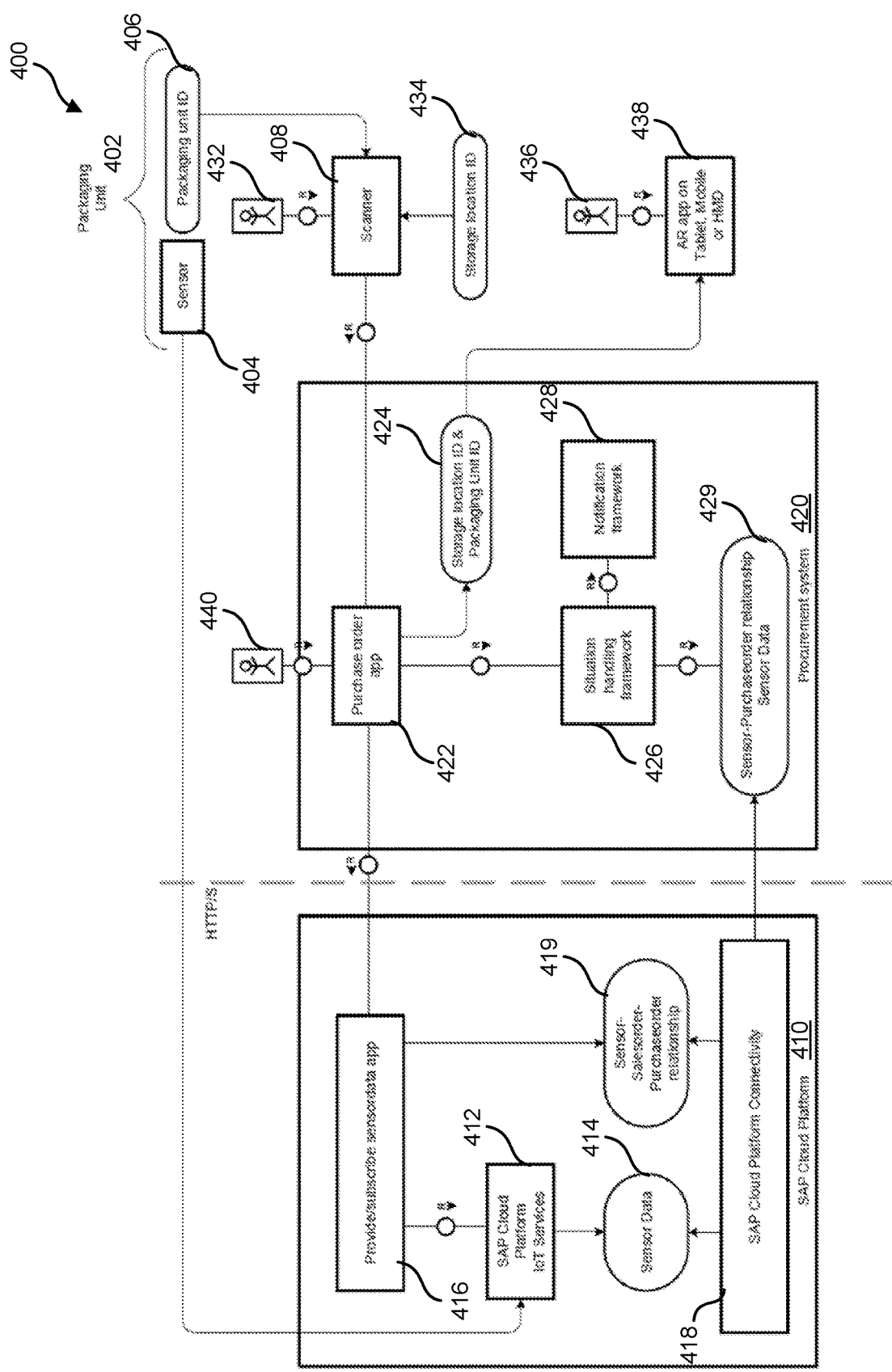
FIG. 4 illustrates a process flow diagram of component interaction of an example goods receipt process.

FIG. 4 illustrates a process flow diagram 400 of component interaction of an example goods receipt process. A purchaser can order an item that is packaged within a packaging unit 402 by a supplier. The packaging unit 402 can include a sensor 404 affixed by the supplier and a packaging unit identification (ID) number 406. Sensor 404 can continuously provide sensor data relating to the packaging unit 402 throughout shipment and/or storage of the packaging unit 402. In some variations, sensor 404 can be a temperature sensor that provides exterior temperature information of the packaging unit 402. This temperature information can be useful if, for example, the item within the packaging unit 402 has certain temperature restrictions. In other variations, sensor 404 can be an accelerometer that provides data relating to conditions experienced by the packaging unit 402, such as whether the packaging unit 402 was dropped or experienced rough handling. Sensor 404 can also have location capabilities such as global positioning system (GPS) capabilities to track and transmit the location of the packaging unit 402. A user can, for example, establish a geo-fence (i.e., a set of coordinates specified, for example, by user-generated input received via a graphical user interface rendering a map, etc.) defining where the package can and cannot go. If the GPS data shows the location of the packaging unit 402 somewhere that violates the geo-fence, the user can be proactively notified via one or more notifications. Some variations may include a sensor 404 that includes temperature measurement, location data, and acceleration measurements.

The data from sensor 404 can be provided to a cloud platform 410 for data storage and/or evaluation. More specifically, the data from sensor 404 can be provided to a cloud platform internet of things (IoT) service 412. The cloud platform IoT service 412 can facilitate storing of the data within a sensor data storage 414. Data from sensor 404 can be recorded and/or transmitted while packaging unit 402 is transiting (e.g., from its source to its destination). Data from sensor 404 be provided from the cloud platform 410 to a procurement system 420, at 416.

The packaging unit ID 406 can be a unique identification mechanism for the packaging unit 402. For example, packaging unit ID 406 can be a bar code, a quick response (QR) code, or any other scanable identifier code. Packaging unit ID 406 provides an identifier for a particular packaging unit 402 so that it may be differentiated from other packaging units.

Upon arrival to a location, such as a storage facility or shipping location, packaging unit 402 can be scanned using a scanner 408. This can be scanned either manually by a user 432 or automatically using an automated scanning system such as a stationary scanning device or a robotic scanning device. The packaging unit 402 can be transported to a temporary storage location. The temporary storage location can also have an identification means such as a bar code, a quick response (QR) code, or any other scanable identifier code. In addition to scanning the packaging unit 402, the storage location identification 434 can also be scanned. An application belonging to a procurement system 420, such as a purchase order application 422, can receive the scanned information of packaging unit 402 and storage location ID 434. This information can be stored, at 424, within procurement system 420.

Procurement system 420 can provide the packaging unit ID 406 and storage location ID 434 to a user 436 such as a worker of the storage facility. In order for user 436 to locate the packaging unit 402 within a storage facility, user 436 can use an VR application display 438. VR application display 438 can run on a number of different electronic devices such as a tablet, mobile device, or head-mounted display (HMD). A virtual version of the storage facility can be portrayed on VR application display 438 (e.g., a 3-dimensional representation of the storage facility). The location of packaging unit 402 can be highlighted within VR application display 438 as illustrated in FIGS. 5B-5C and 6B-6C, described in more detail to follow. With the use of VR application display 438, packaging unit 402 can be quickly located and retrieved. The VR application display 438 can be a camera image overlaid on top of an internal representation of the storage facility.

A user 440 can place an order for goods using a purchase order application 422. For a variety of reasons, user 440 may need to quickly retrieve the goods or be notified of damage done to the goods during shipment. User 440 can flag the need for goods within packaging unit 402 using the purchase order application 422. A user 440 can be proactively triggered of a particular situation using situation handling framework 426 of the procurement system 420. A notification framework 428 of procurement system 420 can provide notifications to user 440 of the status of packaging unit 402. For example, a notification sent by notification framework 428 can alert user 440 that the temperature of packaging unit 402 has reached above or below a certain temperature threshold (e.g., a threshold at which the goods within packaging unit may no longer be acceptable, such as perishable goods). The notification can also notify the user of arrival at the storage facility, its destination, and/or any other intermediary locations. User 440 can interact with the notification and can be navigated to the purchase order application 422. User 440 can be provided with a number of options to remedy the situation, such as contact the supplier or re-order the goods. Sensor data can be transmitted from cloud platform 410 to the procurement system 420 via cloud platform connectivity features 418. Procurement system 420 can receive the sensor data and create/store relationships between the purchase order data from the purchase order application 422 and the sensor data 414, at 429. Cloud platform 410 can also create/store relationship between sensor data 414, sales order data, and purchase order data. The cloud platform 410 and procurement system 420 can communicate between each other using, for example, HTTP.

Figure 5C:
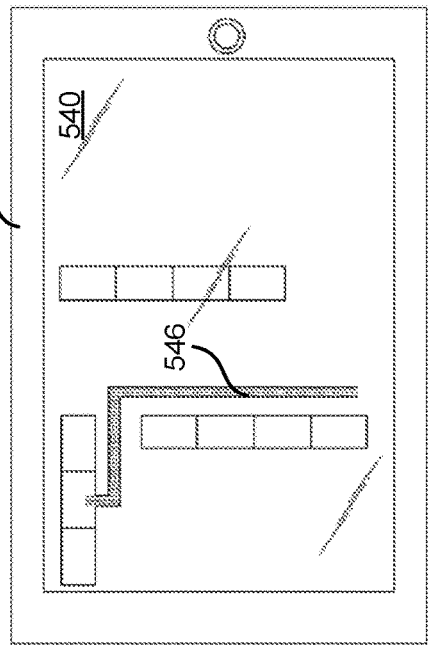
FIG. 5C illustrates another example VR application display on an electronic device.
Figure 5B:
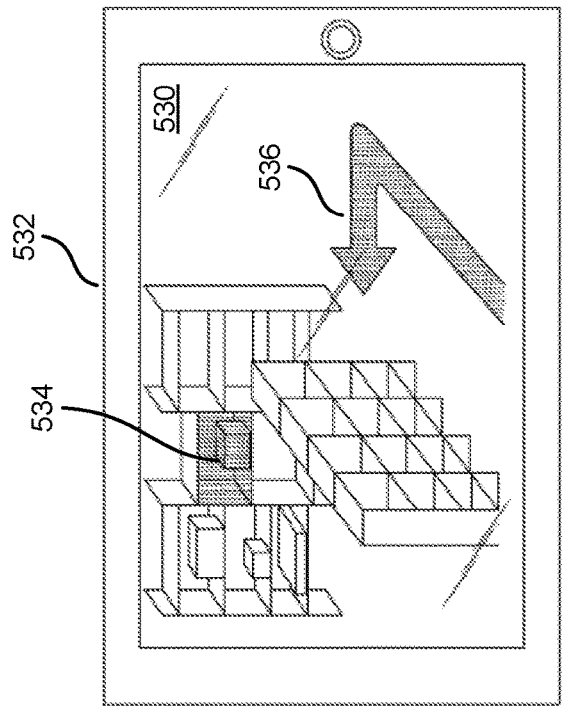
FIG. 5B illustrates an example VR application display on an electronic device.
Figure 5A:
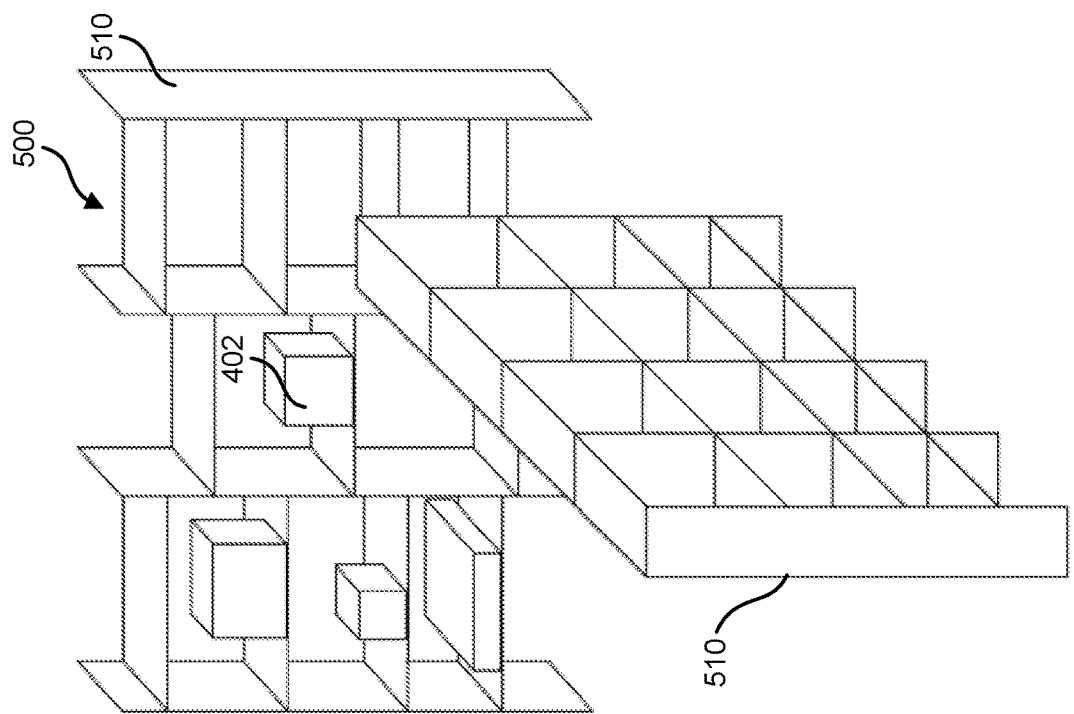
FIG. 5A illustrates a block diagram of an example physical storage space.

FIG. 5A illustrates a block diagram of an example physical storage space 500. A packaging unit 402 can be physically stored within a shelf of shelving unit 510. FIG. 5B illustrates an example VR application display 530 on an electronic device 532. In this example, VR application display 530 provides a user's view (e.g., a view of a user through the viewpoint of pointing a camera at shelving unit 510) of the physical storage space 500. A user, such as user 436, can orient a camera (not shown) of electronic device 532 (e.g., mobile phone, tablet, laptop, wearable computing device, etc.) at a physical storage space 500. The user's view is then virtualized with highlighting to show the location of a packaging unit 402. More specifically, VR application display 530 can display the physical storage space 500 on a display screen of electronic device 532. In other variations, VR application display 530 can provide a view of the physical storage space 500 with additional information overlaid thereon on the display screen of electronic device 532. Procurement system 420 can provide both the storage location ID 434 and packaging unit ID 406 to VR application display 530 (as described with VR application display 438). VR application display 530 can render a highlighted location 534 of packaging unit 402 to a user. VR application display 530 can even provide the user with directional features 536 (e.g., arrows, highlighted aisle ways) as to how to physically navigate to the actual location of the packaging unit 402. A user of electronic device 532 can orient a camera of the device at physical storage space 500. As the user modifies the orientation of electronic device 532, the image rendered on electronic device 532 may update accordingly to reflect the image being actively captured by the camera. The directional features 536 and highlighted location 534 can modify accordingly. FIG. 5C illustrates another example VR application display 540 on an electronic device 542. The VR application display 540 depicts a top-down perspective of physical storage space 500. Directional features 546 highlight to a user on the top-down perspective the location of packaging unit 402.

Figure 6:
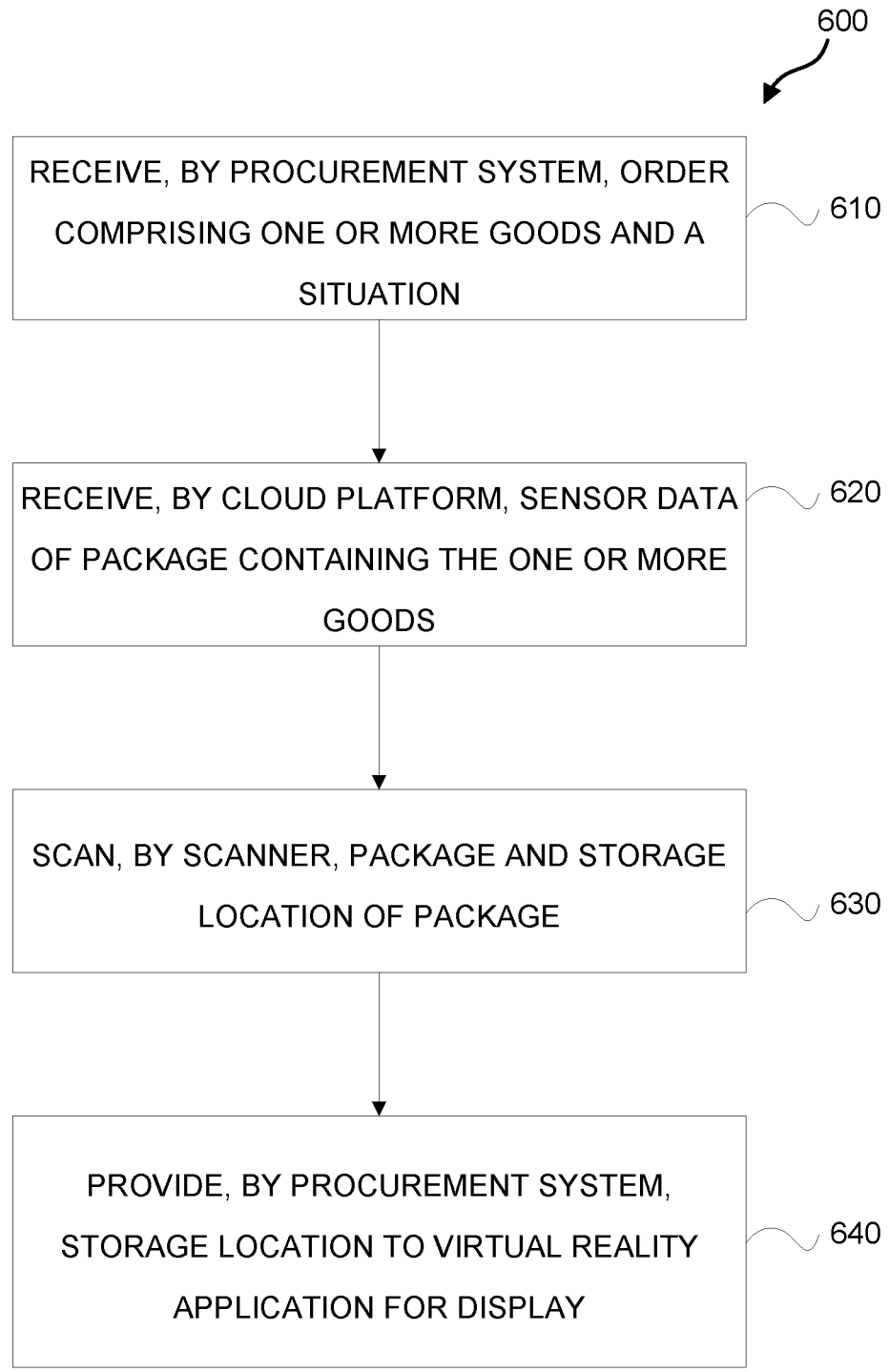
FIG. 6 illustrates a process flow diagram for tracking goods using an VR application.

FIG. 6 illustrates a process flow diagram 600 for tracking goods using a VR application. An order for one or more goods is received, at 610, by a procurement system. Sensor data of a package containing the one or more goods is received, at 620, by a cloud platform. The package and a storage location are scanned, at 630, by a scanner. The storage location is provided, at 640, by the procurement system, to an virtual reality application for display on an electronic device.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 7:
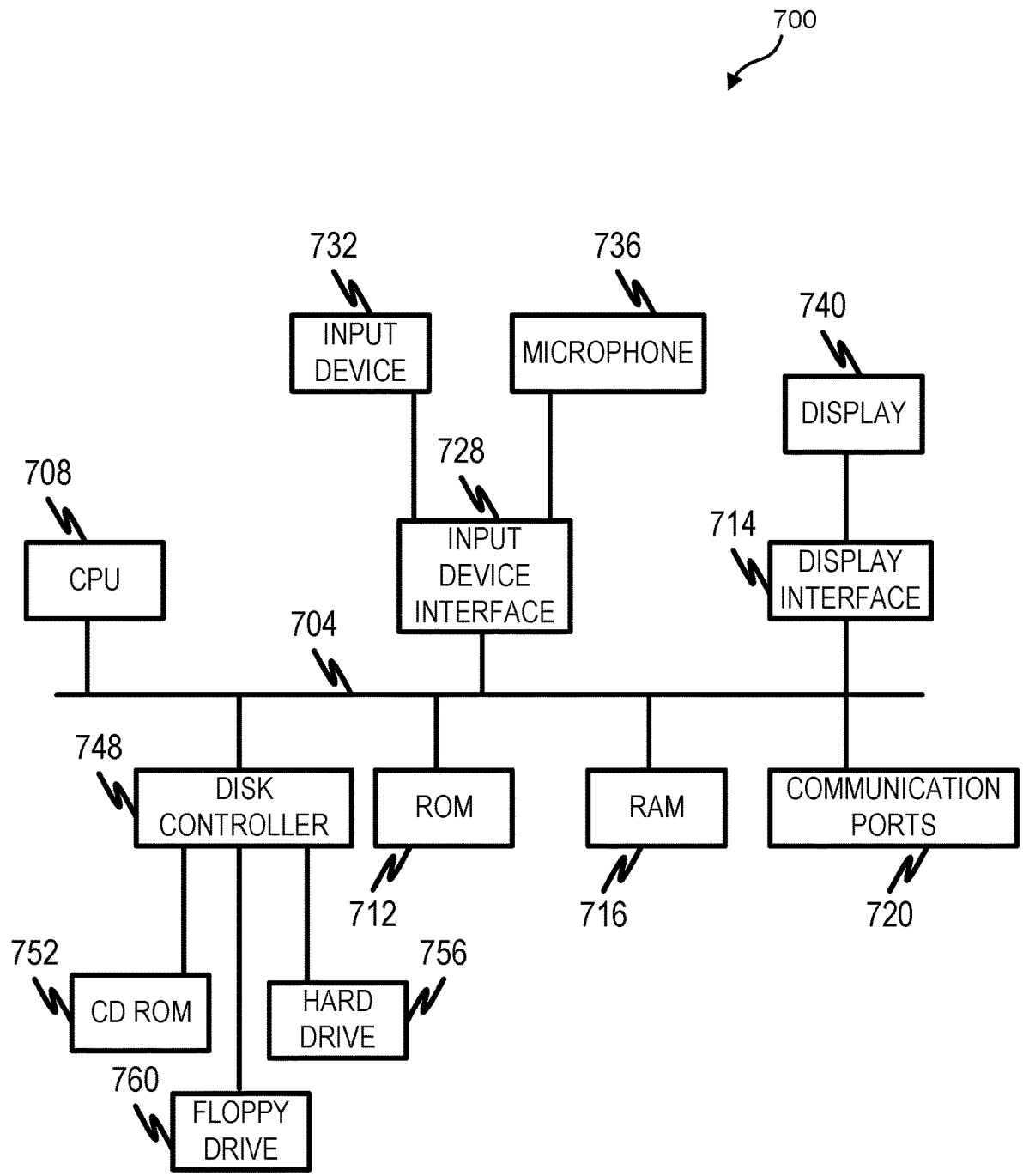
FIG. 7 is a diagram illustrating a sample computing device architecture for implementing various aspects described herein.

FIG. 7 is a diagram 700 illustrating a sample computing device architecture for implementing various aspects described herein. A bus 704 can serve as the information highway interconnecting the other illustrated components of the hardware. A processing system 708 labeled CPU (central processing unit) (e.g., one or more computer processors/data processors at a given computer or at multiple computers), can perform calculations and logic operations required to execute a program. A non-transitory processor-readable storage medium, such as read only memory (ROM) 712 and random access memory (RAM) 716, can be in communication with the processing system 908 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 748 can interface one or more optional disk drives to the system bus 704. These disk drives can be external or internal floppy disk drives such as 760, external or internal CD-ROM, CD-R, CD-RW or DVD, or solid state drives such as 752, or external or internal hard drives 756. As indicated previously, these various disk drives 752, 756, 760 and disk controllers are optional devices. The system bus 704 can also include at least one communication port 720 to allow for communication with external devices either physically connected to the computing system or available externally through a wired or wireless network. In some cases, the communication port 720 includes or otherwise comprises a network interface.

To provide for interaction with a user, the subject matter described herein can be implemented on a computing device having a display device 740 (e.g., a CRT (cathode ray tube) or LCD (liquid crystal display) monitor) for displaying information obtained from the bus 704 to the user and an input device 732 such as keyboard and/or a pointing device (e.g., a mouse or a trackball) and/or a touchscreen by which the user can provide input to the computer. Other kinds of input devices 732 can be used to provide for interaction with a user as well; for example, feedback provided to the user can be any form of sensory feedback (e.g., visual feedback, auditory feedback by way of a microphone 736, or tactile feedback); and input from the user can be received in any form, including acoustic, speech, or tactile input. In the input device 732 and the microphone 736 can be coupled to and convey information via the bus 704 by way of an input device interface 728. Other computing devices, such as dedicated servers, can omit one or more of the display 740 and display interface 714, the input device 732, the microphone 736, and input device interface 728.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   receiving, at a procurement system, a purchase order from a purchase order application, the purchase order having been flagged as containing a good that may need to be urgently retrieved;
   receiving, at the procurement system, scanned information about a physical packaging unit containing the good received at a warehouse, from a cloud platform service running on a cloud platform the scanned information comprising at least:
   (a) data from a sensor affixed to the physical packaging unit, from a cloud platform service running on a cloud platform,
   (b) a packaging unit identification scanned from an identification mechanism affixed to the physical packaging unit, and
   (c) a scanned location identification for a temporary storage location at which the physical packaging unit is temporarily stored;
   generating, at the procurement system, a relationship between the purchase order and the scanned information;
   in response to a determination that the purchase order has been flagged as containing a good that may need to be urgently retrieved, and the data from the sensor indicating a situation that the good needs to be urgently retrieved, automatically triggering an alert of the situation to a user and an indication that the user needs to use a virtual reality application display to urgently retrieve the good; and
   causing the virtual reality application display to render a user's view of the warehouse with the physical packaging unit highlighted and warehouse aisles leading to the physical packaging unit highlighted as an overlay in a physical display, using the packaging unit identification and the scanned location identification.

2. The method of claim 1, wherein the virtual reality application display is further caused to render directional arrows leading to the physical packaging unit.

3. The method of claim 2, wherein the directional arrows are presented in a top-down perspective.

4. The method of claim 1, wherein the cloud platform service and the procurement system communicate with each other via HyperText Transfer Protocol (HTTP).

5. The method of claim 1, further comprising rendering, via the virtual reality application, one or more remedies for the situation based on the alert, the one or more remedies comprising generating a communication to a supplier of the good or generating a re-order of the good.

6. The method of claim 1, wherein the sensor is a temperature sensor and the situation occurs when a temperature of the physical packaging unit exceeds a temperature threshold.

7. The method of claim 1, wherein the sensor is an accelerometer and the situation occurs when an acceleration detected by the sensor indicates the physical packaging unit has been dropped or has experienced rough handling.

8. A system comprising:
at least one hardware processor; and
memory storing an application executable by the at least one hardware processor of the system to perform operations comprising:
receiving, at a procurement system, a purchase order from a purchase order application, the purchase order having been flagged as containing a good that may need to be urgently retrieved;
receiving, at the procurement system, scanned information about a physical packaging unit containing the good received at a warehouse, from a cloud platform service running on a cloud platform the scanned information comprising at least-eluding:
(a) data from a sensor affixed to the physical packaging unit, from a cloud platform service running on a cloud platform,
(b) a packaging unit identification scanned from an identification mechanism affixed to the physical packaging unit, and
(c) a scanned location identification for a temporary storage location at which the physical packaging unit is temporarily stored;
generating, at the procurement system, a relationship between the purchase order and the scanned information;
in response to a determination that the purchase order has been flagged as containing a good that may need to be urgently retrieved, and the data from the sensor indicating a situation that the good needs to be urgently retrieved, automatically triggering an alert of the situation to a user and an indication that the user needs to use a virtual reality application display to urgently retrieve the good; and
causing the virtual reality application display to render a user's view of the warehouse with the physical packaging unit highlighted and warehouse aisles leading to the physical packaging unit highlighted as an overlay in a physical display, using the packaging unit identification and the scanned location identification.

9. The system of claim 8, wherein the virtual reality application display is further caused to render directional arrows leading to the physical packaging unit.

10. The system of claim 9, wherein the directional arrows are presented in a top-down perspective.

11. The system of claim 8, wherein the cloud platform service and the procurement system communicate with each other via HyperText Transfer Protocol (HTTP).

12. The system of claim 8, wherein the operations further comprise rendering, via the virtual reality application, one or more remedies for the situation based on the alert, the one or more remedies comprising generating a communication to a supplier of the good or generating a re-order of the good.

13. The system of claim 9, wherein the sensor is a temperature sensor and the situation occurs when a temperature of the physical packaging unit exceeds a temperature threshold.

14. The system of claim 8, wherein the sensor is an accelerometer and the situation occurs when an acceleration detected by the sensor indicates the physical packaging unit has been dropped or has experienced rough handling.

15. A non-transitory machine-readable storage medium comprising instructions, which when implemented by one or more machines, cause the one or more machines to perform operations comprising:
receiving, at a procurement system, a purchase order from a purchase order application, the purchase order having been flagged as containing a good that may need to be urgently retrieved;
receiving, at the procurement system, scanned information about a physical packaging unit containing the good received at a warehouse, from a cloud platform service running on a cloud platform the scanned information comprising at least:
(a) data from a sensor affixed to the physical packaging unit, from a cloud platform service running on a cloud platform,
(b) a packaging unit identification scanned from an identification mechanism affixed to the physical packaging unit, and
(c) a scanned location identification for a temporary storage location at which the physical packaging unit is temporarily stored;
generating, at the procurement system, a relationship between the purchase order and the scanned information;
in response to a determination that the purchase order has been flagged as containing a good that may need to be urgently retrieved, and the data from the sensor indicating a situation that the good needs to be urgently retrieved, automatically triggering an alert of the situation to a user and an indication that the user needs to use a virtual reality application display to urgently retrieve the good; and
causing the virtual reality application display to render a user's view of the warehouse with the physical packaging unit highlighted and warehouse aisles leading to the physical packaging unit highlighted as an overlay in a physical display, using the packaging unit identification and the scanned location identification.

16. The non-transitory machine-readable storage medium of claim 15, wherein the virtual reality application display is further caused to render directional arrows leading to the physical packaging unit.

17. The non-transitory machine-readable storage medium of claim 16, wherein the directional arrows are presented in a top-down perspective.

18. The non-transitory machine-readable storage medium of claim 15, wherein the cloud platform service and the procurement system communicate with each other via HyperText Transfer Protocol (HTTP).

19. The non-transitory machine-readable storage medium of claim 15, wherein the operations further comprise rendering, via the virtual reality application, one or more remedies for the situation based on the alert, the one or more remedies comprising generating a communication to a supplier of the good or generating a re-order of the good.

20. The non-transitory machine-readable storage medium of claim 16, wherein the sensor is a temperature sensor and the situation occurs when a temperature of the physical packaging unit exceeds a temperature threshold.

* * * * *